(12) United States Patent
Yeung et al.

(10) Patent No.: US 10,699,374 B2
(45) Date of Patent: Jun. 30, 2020

(54) LENS CONTRIBUTION-BASED VIRTUAL REALITY DISPLAY RENDERING

(71) Applicant: Microsoft Technology Licensing, LLC, Redmond, WA (US)

(72) Inventors: Andrew Zicheng Yeung, Seattle, WA (US); Jack Andrew Elliott, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/832,254

(22) Filed: Dec. 5, 2017

(65) Prior Publication Data

US 2019/0172178 A1 Jun. 6, 2019

(51) Int. Cl.
*G06T 3/40* (2006.01)
*G02B 27/01* (2006.01)
(Continued)

(52) U.S. Cl.
CPC ........ *G06T 3/4023* (2013.01); *G02B 27/0172* (2013.01); *G06F 3/011* (2013.01); *G06F 3/147* (2013.01); *G06T 1/60* (2013.01); *G06T 19/003* (2013.01); *G09G 5/005* (2013.01); *G09G 5/024* (2013.01); *G09G 5/395* (2013.01); *H04M 1/72544* (2013.01); *G06F 3/012* (2013.01); *G09G 2340/045* (2013.01);
(Continued)

(58) Field of Classification Search
None
See application file for complete search history.

(56) References Cited

U.S. PATENT DOCUMENTS 6,614,444 B1 9/2003 Duluk et al.
6,664,955 B1 * 12/2003 Deering ................ G06T 3/4007
345/418
(Continued)

FOREIGN PATENT DOCUMENTS

EP 3106912 A1 12/2016
WO 2016099964 A1 6/2016
WO 2017074961 A1 5/2017

OTHER PUBLICATIONS

Kehrer, Brian, "VR Distortion Correction Using Vertex Displacement", Retrieved From <<https://ustwo.com/blog/vr-distortion-correction-using-vertex-displacement>>, Jan. 29, 2016, 16 Pages.
(Continued)

*Primary Examiner* — Aaron M Richer
(74) *Attorney, Agent, or Firm* — Arent Fox LLP

(57) ABSTRACT

Methods and devices for processing image frames is described. The techniques presented herein leverage known characteristics of the optical transfer component in order to modify the resource allocation for rendering the subset of pixels whose contribution to the final rendered image is less than a contribution threshold. Thus, in situations where the deflection of light from the lens may impact the contribution of the one or more subset of pixels of an image frame towards the final rendered image, the image processing techniques presented here may either omit or deprioritize the identified subset of pixels in order to conserve valuable resources (e.g., dedicate less processing time and memory to rendering the identified subset of pixels).

20 Claims, 6 Drawing Sheets

(51) Int. Cl.
   *G09G 5/395*    (2006.01)
   *G06F 3/147*    (2006.01)
   *G06F 3/01*     (2006.01)
   *G09G 5/02*     (2006.01)
   *H04M 1/725*    (2006.01)
   *G06T 19/00*    (2011.01)
   *G06T 1/60*     (2006.01)
   *G09G 5/00*     (2006.01)

(52) U.S. Cl.
   CPC ..... *G09G 2350/00* (2013.01); *G09G 2354/00* (2013.01); *G09G 2370/18* (2013.01)

(56) References Cited

U.S. PATENT DOCUMENTS

| | | |
|---|---|---|
| 6,781,585 B2 | 8/2004 | Naegle et al. |
| 6,781,600 B2 | 8/2004 | Anwar |
| 7,453,459 B2 | 11/2008 | Shekter |
| 9,087,409 B2 | 7/2015 | Gruber |
| 9,589,367 B2 | 3/2017 | Golas et al. |
| 2013/0169529 A1* | 7/2013 | Ek .................. G02B 27/0093 345/156 |
| 2016/0238852 A1 | 8/2016 | Ellsworth et al. |
| 2017/0230558 A1* | 8/2017 | Morales .................. G06K 9/46 |

OTHER PUBLICATIONS

"International Search Report & Written Opinion Issued in PCT Patent Application No. PCT/US2018/062373", dated Feb. 15, 2019, 16 Pages.

\* cited by examiner

LENS CONTRIBUTION-BASED VIRTUAL REALITY DISPLAY RENDERING

BACKGROUND

The present disclosure relates to computer graphics systems, and more particularly, to devices and methods of leveraging characteristics of an optical transfer component (e.g., lens or component for transforming optical light) in virtual reality (VR), augmented reality (AR), and/or mixed reality (MR) applications in order to identify and deprioritize (or omit) the rendering of pixels that contribute less than a contribution threshold to the final image's visual quality due to the distortion caused by the optical transfer component.

Use of computing devices is becoming more ubiquitous by the day. Computing devices range from standard desktop computers to wearable computing technology and beyond. One area of computing devices that has grown in recent years are virtual reality (VR) devices, which rely on a graphics processing unit (GPU) to render graphics from a computing device to a display device based on rendering instructions received from the computing device. In VR devices, the image to be produced on a display device can be oriented or modified based on user input, where the input may include detecting movement of the user's head (e.g., detected movement of the VR device mounted on the user's head).

In existing systems, due to distortion of the optical transfer component (e.g., barrel distortion and chromatic aberration), the VR applications are forced to render content to be displayed at a different resolution than the actual resolution of the display panel, which results in mismanagement of system resources. Particularly, in conventional systems, in order to maintain a minimum level of pixel density (e.g., density of rendered pixels contributing to a region of the display) and the field of view, an image must be rendered at a pixel width and/or height that is larger than the final physically displayed pixel width and height. This leads to waste of limited GPU and memory resources. The resource and time inefficiency may also lead to a less than desirable user experience.

Thus, there is a need in the art for improvements in rendering of images for presentation on a display device.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a method for processing an image frame. The method may include identifying a resolution of a source image associated with the image frame, wherein the source image is rendered by an application on a computer device to be displayed on a display device. The method may also include identifying a characteristic of an optical transfer component of the display device that transforms optical light associated with pixels of the source image to a final rendered image that is displayed on the display device. The method may also include determining that a contribution of a subset of pixels of the source image towards the final rendered image that will be displayed on the display device is less than a contribution threshold based on the characteristics of the optical transfer component. The method may modify, in response to the determining, a resource allocation for rendering the subset of pixels. The method may also include displaying the final rendered image of the image frame on the display device based on the modifying.

In another example, a computer device for processing an image frame is disclosed. The computer device may include a memory to store data and instructions, a processor in communication with the memory. The processor may be configured to execute instructions to identify a resolution of a source image associated with the image frame, wherein the source image is rendered by an application on a computer device to be displayed on a display device. The processor may also be configured to execute instructions to identify a characteristic of an optical transfer component of the display device that transforms optical light associated with pixels of the source image to a final rendered image that is displayed on the display device. The processor may also be configured to execute instructions to determine that a contribution of a subset of pixels of the source image towards the final rendered image that will be displayed on the display device is less than a contribution threshold based on the characteristics of the optical transfer component. The processor may also be configured to execute instructions to modify, in response to the determining, resource allocation for rendering the subset of pixels. The processor may also be configured to execute instructions to display the final rendered image of the image frame on the display device based on the modifying.

Another example implementation relates to computer-readable medium storing instructions executable by a computer device. The instructions may include code for identifying a resolution of a source image associated with the image frame, wherein the source image is rendered by an application on a computer device to be displayed on a display device. The instructions may include code for identifying a characteristic of an optical transfer component of the display device that transforms optical light associated with pixels of the source image to a final rendered image that is displayed on the display device. The instructions may include code for determining that a contribution of a subset of pixels of the source image towards the final rendered image that will be displayed on the display device is less than a contribution threshold based on the characteristics of the optical transfer component. The instructions may also include code for modifying, in response to the determining, resource allocation for rendering the subset of pixels, and displaying the final rendered image of the image frame on the display device based on the modifying.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1A:
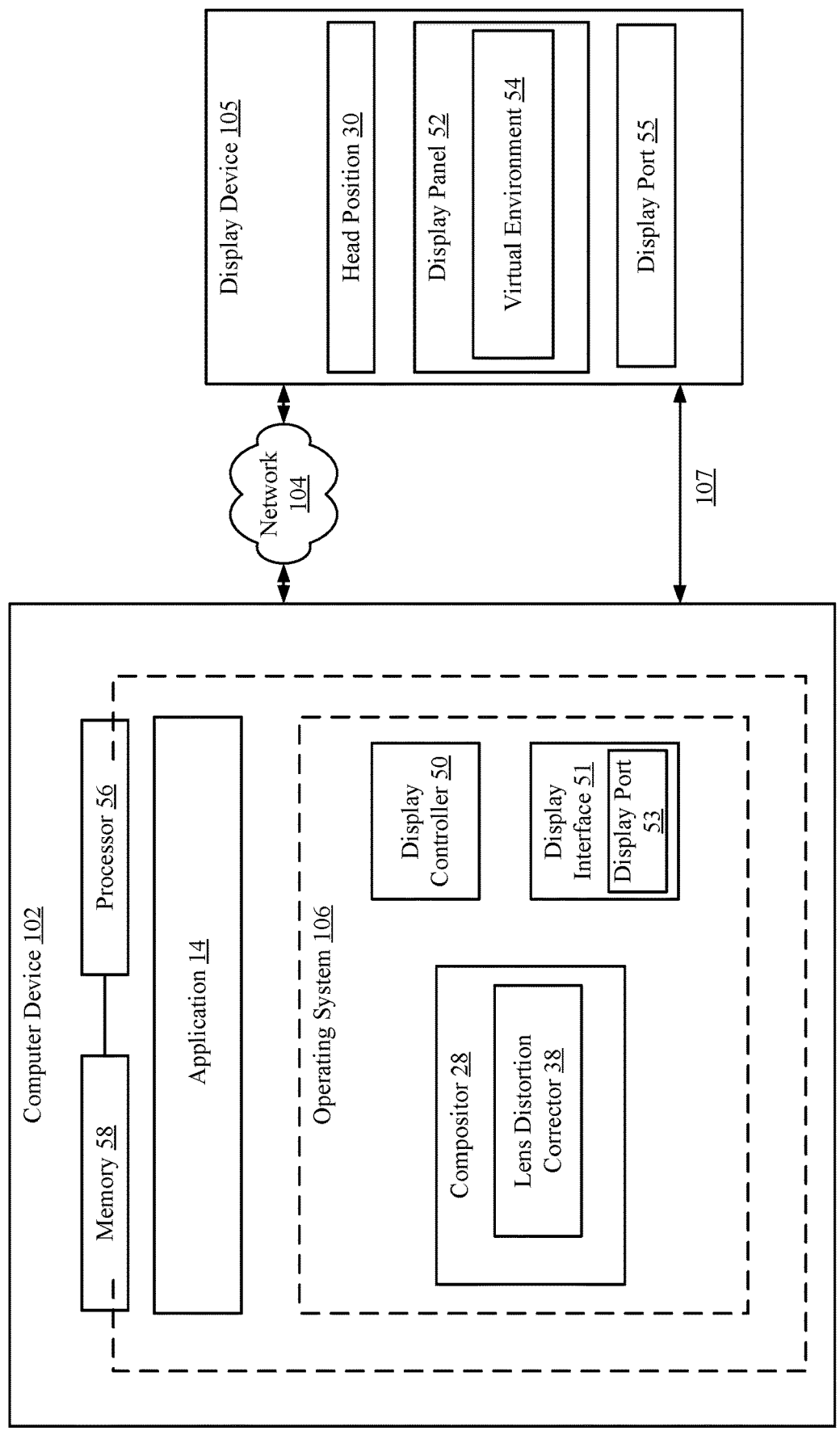
FIGS. 1A and 1B are schematic block diagrams of an example computer device implementing the image processing techniques for a display device (e.g., head mounted display) in accordance with an implementation of the present disclosure.

This disclosure relates to devices and methods of leveraging known characteristics of an optical transfer component (e.g., lens or a device that may transform light associated with in virtual reality (VR) applications in order to identify and omit (or deprioritize) one or more of the rendering of pixels that fail to contribute (or contribute less) to the final image's visual quality due to the lens distortion. As used herein, the term virtual reality (VR) relates to at least partially virtual environment, and may include mixed reality (MR) (e.g., combining of at least two virtual environments) and augmented reality (AR) (e.g., combining of a real world environment with at least one virtual environment).

As discussed above, in existing systems, the VR applications are forced to render content to be displayed at a different resolution than the actual resolution of the panel because the areas in the rendered image generally include more holes (e.g., areas closer to the edges) than areas where there are no holes (e.g., areas closer to the middle of the image). The term "holes" may refer to pixel(s) in the source image that fails to contribute to the filling in of the final rendered image pixels.

One solution that has been attempted to address this issue is to omit pixels at the outer portions of the source image (herein referred to as "outer pixels") because those pixels may not generally contribute to the final image. In such situations, omitted pixels are selected in a way that is not proportional to the optical transfer function. As such, completely removing the outer pixels may cause the resolution of the final image to suffer in situations where the outer pixels do in fact end up contributing to portions of the final image.

Some proposed solutions include omitting the outer pixels and subsequently performing a "resolve step" where the omissions of pixels may be filled in with data from a combination of past frames and/or pixels that were rendered adjacent to the omitted pixel. This process, however, is processor (e.g., CPU and/or GPU) resource intensive.

Thus, image processing techniques presented herein may solve one or more of the above-identified problem(s) by leveraging known characteristics of the optical transfer component (e.g., lens or device that may transform light associated with an image in the display device) in order to modify the resource allocation for rendering the subset of pixels whose contribution to the final rendered image is less than a contribution threshold. This may be because either the subset of pixels do not contribute to the final image, or the contribution of the subset of pixels is not significant. For purposes of this disclosure, the term "contribute" or "contribution" with respect to pixels may refer to the level of resolution achieved by the final rendered image that is dependent on the subset of pixels corresponding to the source image. Thus, in situations that the deflection of light from the lens may impact the contribution of the one or more subset of pixels of an image frame towards the final rendered image, the image processing techniques presented here may either omit or deprioritize the identified subset of pixels in order to conserve valuable resources (e.g., by dedicating less processing time and memory to render the identified subset of pixels). This may be achieved by modifying the resource allocation (e.g., processor, GPU, memory, etc.) used to render the subset of pixels. Thus, for purposes of this disclosure, the phrase "modifying the resource allocation" may refer to techniques that may or may not actually omit the identified pixel. Instead, in some situations where pixels are not omitted, rendering techniques provided herein may inform the application of identified pixels (or subset of pixels) that may be filled using lower quality rendering that require less resources to produce. As such, the computing requirements of the present disclosure may be lower than the conventional techniques while maintaining equivalent or better visual quality. Additionally, the term "subset of pixels" may refer to either part of a full set of pixels or, in some situations, the entire set of pixels. Particularly, in situations where all pixels may contribute to the final rendered image, the subset of pixels may encompass all pixels. In such situations, where each pixel in the set of pixels may provide some contribution to the final rendered image, the level of contribution of each pixel within the set of pixels may vary (e.g., some pixels may contribute more to the final rendered image than others). The level of contribution may be determined based on the contribution threshold that may be predetermined or dynamically adjusted. To this end, the display device may prioritize one or more pixels that contribute more than other pixels in allocating rendering resources. To implement the image processing techniques, the described apparatus and methods may, for each frame to be rendered, consider one or more of: (1) the characteristics of an optical transfer component (e.g., the field of view, distortion at various viewing directions of a lens, etc.); (2) size of the final image (e.g., the physical display size); and/or (3) resolution of the source image (e.g., the image rendered by the application or other source). Based on the one or more of these factors, the described apparatus and methods may identify the pixels that can be omitted or deprioritized from rendering while maintaining a quantifiably maximal visual quality.

Figure 1B:
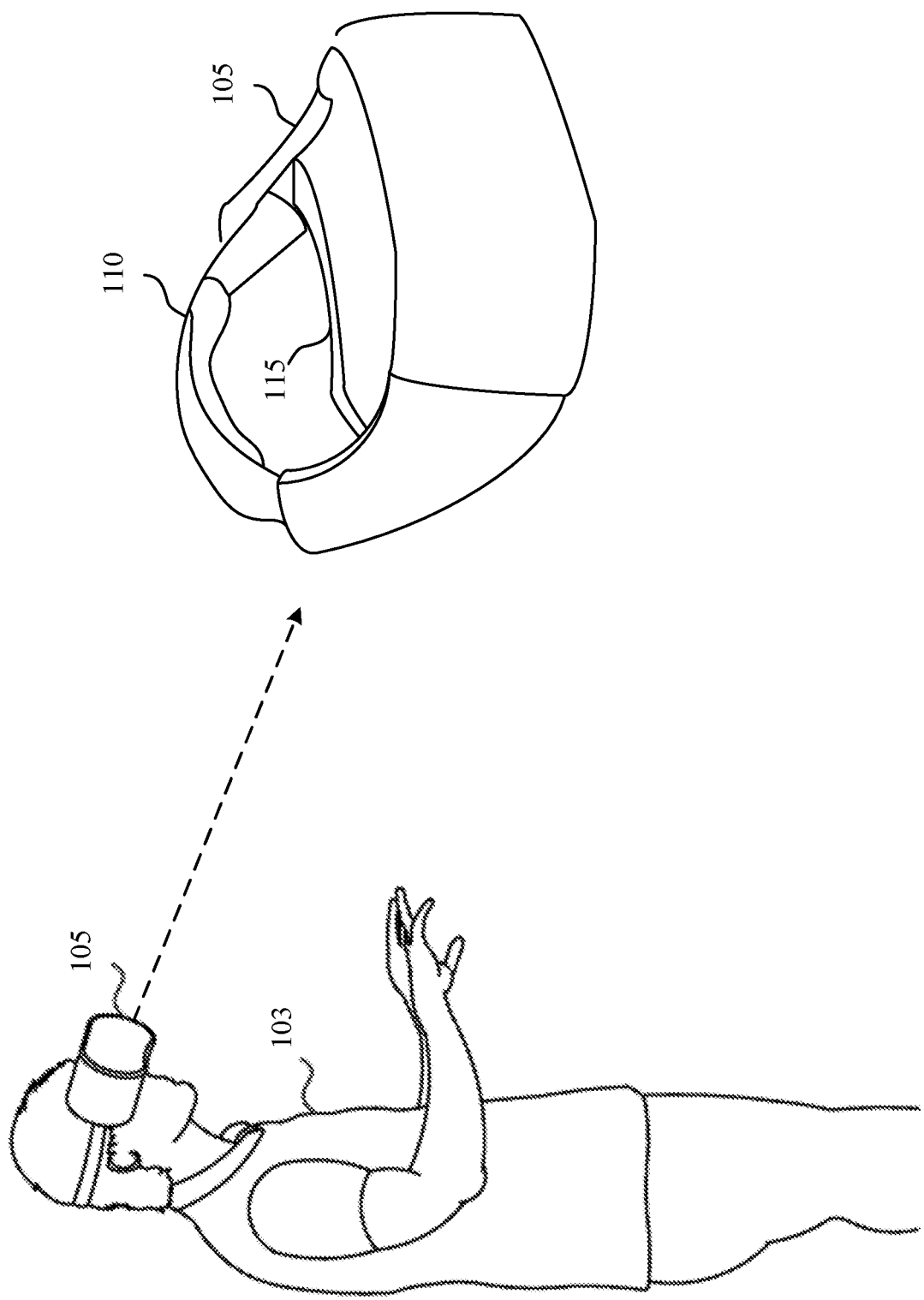

Referring now to FIG. 1A and FIG. 1B, an example system 100 for use in connection with rendering virtual reality images may include a computer device 102 in communication with one or more display devices 105. Computer device 102 may communicate image data for displaying VR images on display device 105. Display device 105 may include, for example, a head mounted display (HMD) 105 illustrated in FIG. 1B and discussed herein contemporaneously with reference to FIG. 1A.

The HMD 105 may be configured to provide virtual reality images (e.g., from at least one virtual environment input), mixed reality (MR) images (e.g., from at least two virtual environment inputs), and/or augmented reality (AR) images (e.g., from at least one virtual environment input and one real environment input). The HMD 105 comprises a headpiece 110, which may be a headband, arranged to be worn on the head of user 103. It should be appreciated by those of ordinary skill in the art that the HMD 105 may also be attached to the user's head using a frame (in the manner of conventional spectacles), helmet, or other fit system. The purpose of the fit system is to support the display and provide stability to the display and other head-borne systems such as tracking systems, sensors, and cameras.

The HMD 105 may include optical components 115 (e.g., one or more lenses), including waveguides that may allow the HMD 105 to project images generated by a light engine included within (or external) to the HMD 105. The optical components 115 may use plate-shaped (usually planar) waveguides for transmitting angular image information to users' eyes as virtual images from image sources located out of the user's line of sight. The image information may propagate along the waveguides as a plurality of angularly related beams that are internally reflected along the waveguide. Diffractive optics are often used for injecting the image information into the waveguides through a first range of incidence angles that are internally reflected by the waveguides as well as for ejecting the image information through a corresponding range of lower incidence angles for relaying or otherwise forming an exit pupil behind the waveguides in a position that can be aligned with the users' eyes. Both the waveguides and the diffractive optics at the output end of the waveguides may be at least partially transparent so that the user can also view the real environment through the waveguides, such as when the image information is not being conveyed by the waveguides or when the image information does not fill the entire field of view.

The light engine (not shown), which may project images to be displayed on the optical components 115, may comprise a light source (e.g., a laser), a micro display and imaging optics in the form of a collimating lens. The micro display can be any type of image source, such as liquid crystal on silicon (LCoS) displays, liquid crystal displays (LCD), matrix arrays of LED's (whether organic or inorganic) and any other suitable display. The optical components 115 may focus a user's vision on one or more portions of one or more display panels. The display panels may display one or more images (e.g., left eye image and right eye image) based on signals received from the light engine. Thus, the optics may include left eye optics for focusing the user's left eye on the left eye image and right eye optics for focusing the user's right eye on the right eye image. For example, the optics 115 may focus the user's eyes on a central portion of each of the left eye image and the right eye image. The user's brain may combine the images viewed by each eye to create the perception that the user is viewing a 3D environment.

The HMD 105 may also include a frame or slot (not shown) for coupling a smartphone or other portable computing device to the HMD 105 in a way that exposes the display screen of the smartphone to the internal optics 115. The HMD 105 may transition between AR and VR scenarios by causing the optical members to either pass light or block light, thereby either showing or hiding view of the real world while presenting virtual content to the user.

In FIG. 1A, a processor 56, memory 58 and other components may be integrated into and in communication with the HMD device 105 (also see FIG. 5), such as via wired or wireless communication link 107. Alternatively, such components may be housed in a separate housing connected to the HMD 105 by wired and/or wireless communication links (e.g., over network 104). For example, the components may be housed in a separate computer device 102 (e.g., smartphone, tablet, laptop or desktop computer, etc.) which communicates with the display device 105.

Computer device 102, which may be separate or part of the display device 105, may include an operating system 106 executed by processor 56 and/or memory 58 of computer device 102. Memory 58 of computer device 102 may be configured for storing data and/or computer-executable instructions defining and/or associated with operating system 106, and processor 56 may execute operating system 106. An example of memory 58 can include, but is not limited to, a type of memory usable by a computer, such as random access memory (RAM), read only memory (ROM), tapes, magnetic discs, optical discs, volatile memory, non-volatile memory, and any combination thereof. An example of processor 56 can include, but is not limited to, any processor specially programmed as described herein, including a controller, microcontroller, application specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

Computer device 102 may include one or more applications 14 that may be executed by processor 56 to present one or more virtual reality images on display device 105. The one or more applications 14 may include, for example, different VR applications (e.g., including MR and/or AR applications) that may generate a virtual environment 54. In addition, the one or more applications 14 may provide content for virtual environment 54. For example, an application 14 may provide a virtual game for the virtual environment 54 or provide an object that may be used within virtual environment 54.

The operating system 106 of the computer device 102 may also include a compositor 28 for processing image data to be rendered onto the display device 105. The image data may be modified or adjusted based on user input (e.g., movement of user's head position when the display device 105 is a HMD). To that end, the display device 105 may capture and communicate a head position 30 of a user wearing display device 105 to computer device 102. The head position 30 of a user may be determined from head motion input received from HMD tracking information (e.g., a position and/or orientation of the HMD 105).

In addition, compositor 28 may include a lens distortion corrector 38 to apply lens distortion corrections, such as to account for barrel distortion and chromatic aberration in the projection of the original image into the composite image 46 in the final virtual environment 54. It should be appreciated that the lens distortion corrector 38 is not limited to optical lens, but may also include any optical transfer component that may transform light in a display device. In addition, lens distortion corrector 38 may perform passive or active transformations to correct for other possible lens distortions. Compositor 28 may take into account a variety of distortion corrections for optical transfer component to ensure the output image transforms correctly for display on display device 105. Although the compositor 28 and the lens distortion corrector 38 is illustrated as part of the computer device 102, it should be appreciated that components and subcomponents may be interchangeably included in the display device 105 such as, for example, when the display device 105 (e.g., HMD) is operating as a standalone device.

Compositor 28 may also communicate with display controller 50 to transmit the image data for presentation on the downstream consumers. In an implementation, display controller 50 may communicate with a display interface 51 that may be communicatively coupled with the processor 56 and/or memory 58 for communicating with the display device 105 via a display ports 53 and 55. Display ports 53 and 55 may include various types of ports including, but not limited to, high definition multimedia interface (HDMI) ports, display serial interface (DSI) ports, mobile industry processor interface (MIPI) DSI ports, universal serial bus (USB) ports, Firewire ports, or other embedded or external wired or wireless display ports that can allow communications, for example, via network 104 between computer device 102 and display device 105. Display device 105, as noted above, may include a display panel 52 such as optical components that present virtual environment 54 to the user.

Figure 2:
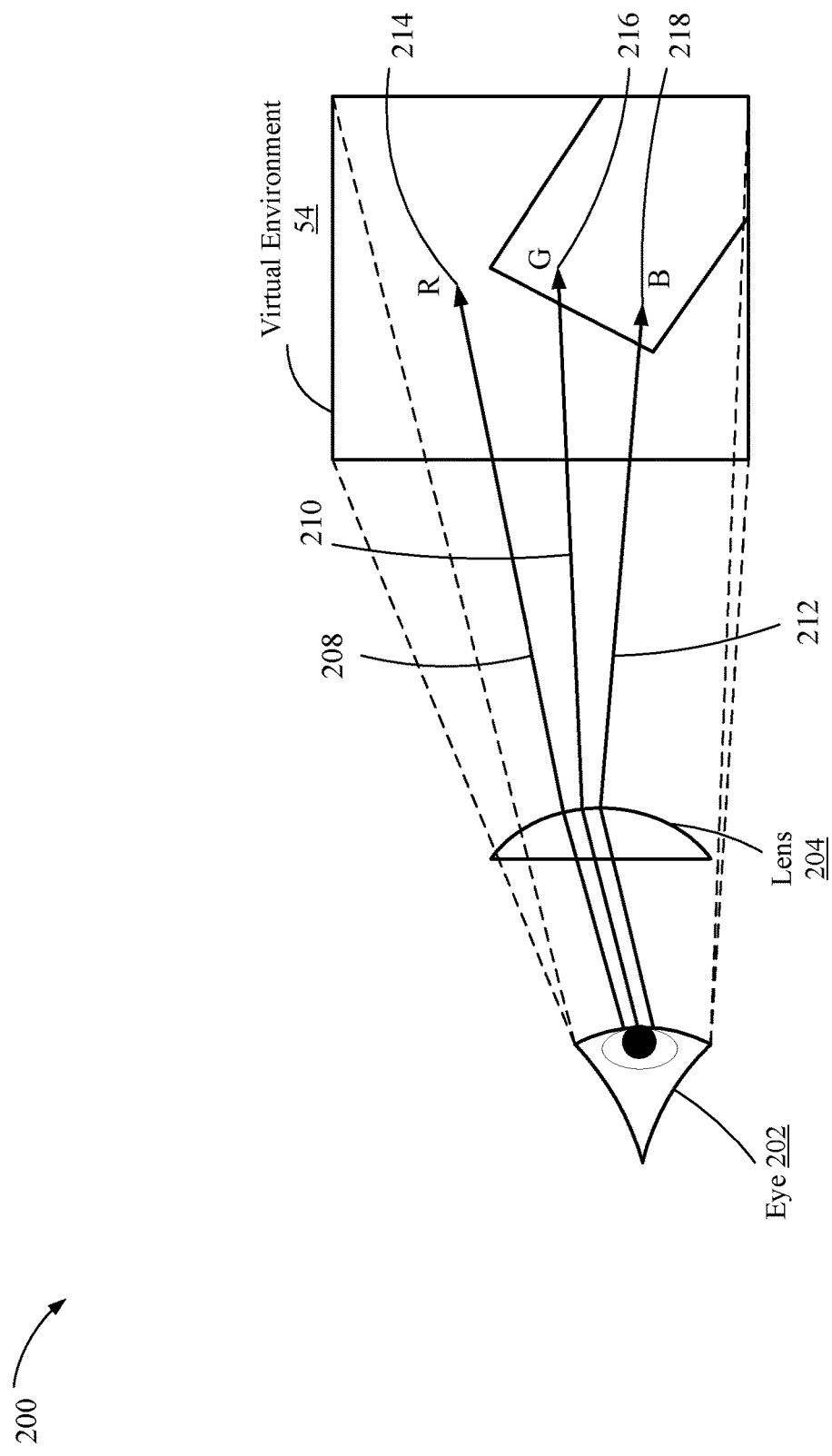
FIG. 2 is a schematic diagram of an example of distortion of an optical transfer component in accordance with an implementation of the present disclosure.

Referring now to FIG. 2, illustrated is an example diagram 200 of an optical transfer component distortion that may occur to a rendered image when light passes through an optical transfer component 204 (e.g., lens) of a display device from the viewpoint of a user 202 in accordance with an implementation. For example, when the red light ray 208, green light ray 212, and blue light ray 212 of the rendered image pass through the optical transfer component 204, some distortion may occur, such as barrel distortion and chromatic aberration. As such, the red light ray 208 may end at position 214 in the virtual environment 54, the green light ray 210 may end at position 216 in the virtual environment 54, and the blue light ray 212 may end at position 218 in the virtual environment 54.

Lens distortion corrector 38 (FIG. 1A) may apply one or more optical transfer component distortion corrections to account for any barrel distortion and/or chromatic aberration when the rendered image is projected through a lens of the display device 105. For example, lens distortion corrector 38 may work backward from the end positions 214, 216, and 218 of the red light ray 208, the green light ray 210, and the blue light ray 212 to a single position to correct for any distortion that may occurred through the lens 204.

Additionally or alternatively, the lens distortion corrector 38 may leverage the known characteristics of the optical transfer component (e.g., barrel distortion and/or chromatic aberration) in order to either omit or deprioritize the pixels that fail to contribute (or contribute less than a contribution threshold) to the final image being rendered. In some examples, the lens corrector 38 may inform one or more applications 14 of the computer device 102 of identified pixels that may be filled (or substituted) using lower quality rendering (e.g., pixels rendered using lower quality textures) that cost less to produce as oppose to actually omitting the pixel. Thus, the lens corrector 38, for each image frame, may consider one or more of: (1) the characteristics of the optical transfer component (e.g., the field of view, distortion at various viewing directions, etc.); (2) size of the final image (i.e., the physical display size); or (3) resolution of the source image (i.e. the image rendered by the application or other source). Based on one or more of these three factors, the apparatus and methods of the present disclosure may identify the pixels that can be omitted or deprioritized from rendering while maintaining a quantifiably maximal visual quality.

Figure 3:
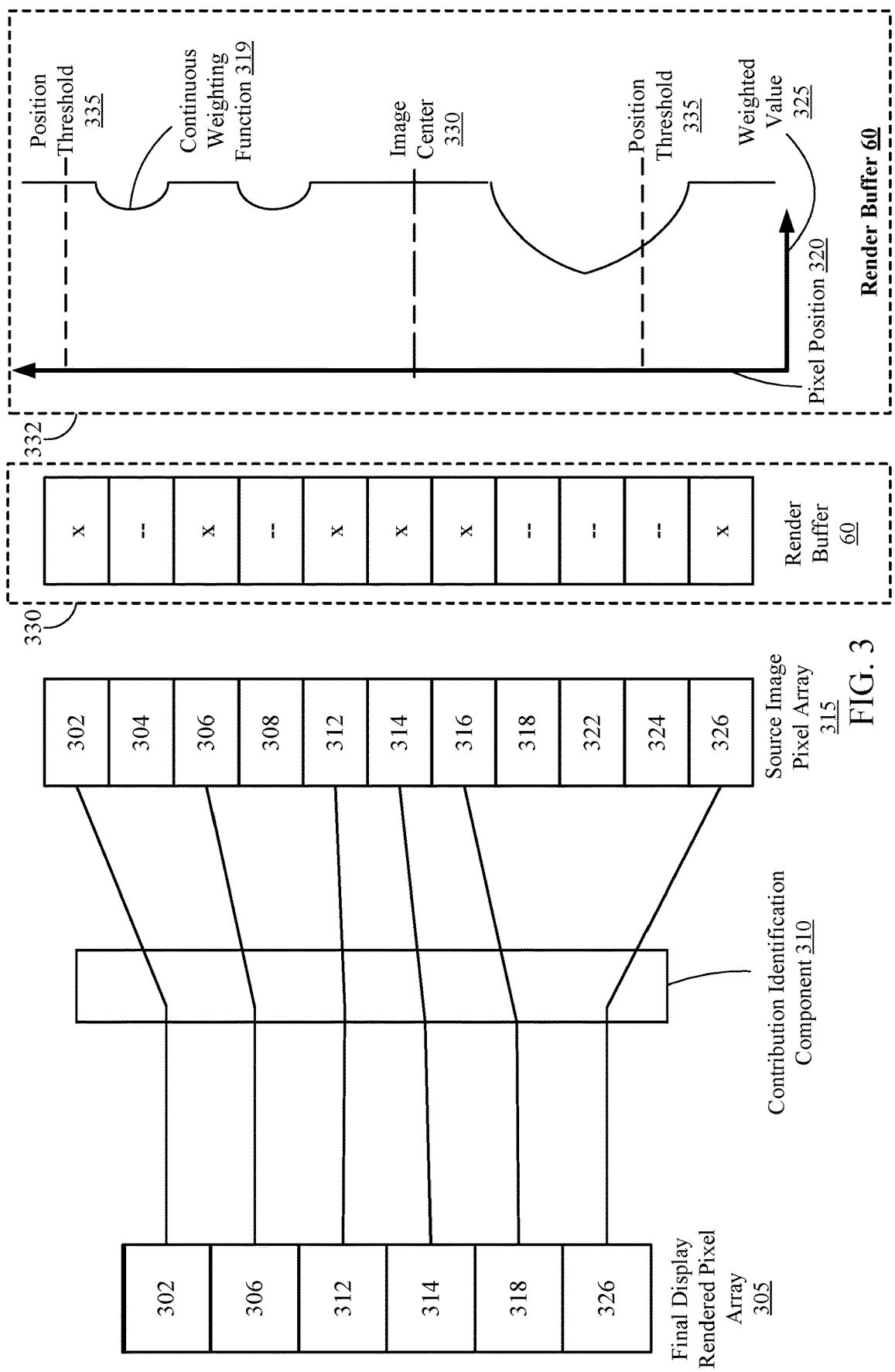
FIG. 3 is a diagram of a compositor of the computer device of FIGS. 1A and 1B identifying one or more pixels that may contribute to the final rendered image and further processing only selected pixels or weighted pixels respectively based on a binary or non-binary solution, in accordance with an implementation of the present disclosure.

Specifically, as illustrated in FIG. 3, because light is distorted by the optics transfer component, such as lens 204, not every source image pixel in a source image pixel array 315 may correlate one-to-one with the pixels in the final display rendered pixel array 305. For example, as illustrated in FIG. 3, the source image pixel array 315 may include a set of pixels 302-326 associated with the image frame of the source image to be displayed on a display device 105. However, once optics function (e.g., lens 204) is applied to light associated with the set of pixels 302-326, a subset of pixels (e.g., pixels 304, 308, 318, 322, and 324) of the full set of pixels (302-326) may fail to contribute (or contribute less) to the final rendered image than a contribution threshold. As illustrated, for an image frame, pixels 304, 308, 318, 322, and 324 may not contribute to the final image. A contribution identification component 310 may identify the one or more pixels that contribute less than the contribution threshold based on optical transfer component characteristics.

Accordingly, compositor 28 (FIG. 1A), and more particularly contribution identification component 310, operating according to the present techniques may trace which of the pixels of the source image pixel array 315 end up in the final rendered image. The compositor 28 may apply one or more techniques, including applying a binary function 330, e.g., including or omitting pixels, or a non-binary function 332, e.g., for a weighting value to the pixels, and storing the resultant included or weighted pixels in the render buffer 60. More specifically, using the "binary" function 330, the compositor 28 may identify the subset of pixels (304, 308, 318, 322, and 324) that contribute less than a contribution threshold, and selectively omit rendering of such pixels, thereby conserving system resources (e.g., processor and/or memory). In other examples, the compositor 28 may apply the "non-binary" function 332 whereby a weighted value (or "score") is applied to each source pixel (e.g., 302-326) in the set of pixels based on determination of a distance of the source pixel to a contributing pixel.

Particularly, as the pixel position moves away from the center 320 of an image, a greater number of pixels may contribute less towards the final rendered image. Because the render resolution and the display resolution are both discrete quantities, features of the present disclosure may leverage this information to selectively "omit and/or deprioritize" pixels that may not contribute or contribute less to the final image.

In one example, such as in a binary solution using the binary function 330, the pixels from the final display rendered pixel array 305 can be traced back to the corresponding pixels in the source image pixel array 315, and only those occurring in the final image may be processed. For instance, in this example, the subset of pixels (304, 308, 318, 322, and 326) without corresponding pixels in the final display rendered pixel array 305 are omitted from further processing, and thus are not included in the render buffer 60.

In another example, such as in a weighted solution using the non-binary function 332, by computing where the final display rendered pixel array 305 will source its pixels from within the source image pixel array 315 in continuous space with respect to the final rendered image, the lens corrector 38 may apply a weighted value 325 (or "weighting") to each pixel based on its relation to the position 320 identified as the 'sourcing position' within the final rendered image. In one design, the weight value 325 may be assigned based on the distance in continuous space from the closest sourcing position. For example, the pixels 318 and 324 may be allocated a greater weighted value than pixel 322 because the distance between pixels 318 and 324 to sourcing position of a contributing pixel (e.g., pixels 316 and 326) is less than the distance from pixel 322 to the contributing pixel. As such, while both pixels 318 and 322 may be allocated lower resources, pixel 318 may nonetheless be rendered at a higher quality (e.g., a pixel rendered using higher quality textures) than pixel 322 that has a lower weighted value.

In an alternative or in addition to this particular design, the lens corrector 38 may elect to identify any pixel outside a certain distance (e.g., position threshold 335) to be considered omitted (e.g., the lens distortion corrector 38 and display controller 50 may elect against rendering the identified pixels (e.g., pixels 302 and 326) whose position is greater than the position threshold 315.

In another weighted solution design, a continuous weighting function 319 can be applied to each pixel based on the pixel position to indicate which pixels should be rendered with lower quality by modifying the resource allocations for the selected pixels. For example, a non-binary pixel representation continuous weighting function 319, e.g., a line, associated with each optics function 310 based on one or more lens characteristics may be utilized.

Thus, in such non-binary, e.g., weighted, solution implementations, as opposed to outright omitting rendering of one or more pixels (e.g., pixels 304 and 308) as in the binary solution, the lens distortion corrector 38 and display controller 50 may modify the resources (e.g., processor and memory) in processing the pixels (e.g., pixels 302 and 312) based on the weighting resulting from the continuous weighting function 325 and/or that fall outside of the position threshold 335, or by extension contribute less than a contribution threshold. Because the contribution of one or more subset of pixels is limited, the lens distortion corrector 38 and display controller 50 may display the selected pixels (e.g., 304, 308, 318, 322, 324) that are rendered at a lower quality than other pixels (e.g., pixels 302, 306, 312, 314, 316, and 326) that contribute greater to the final rendered image than the contribution threshold.

In yet another example, one or both of the above binary and non-binary weighting techniques may be implemented in order to improve image quality while reducing the processing requirements of the GPU.

Figure 4:
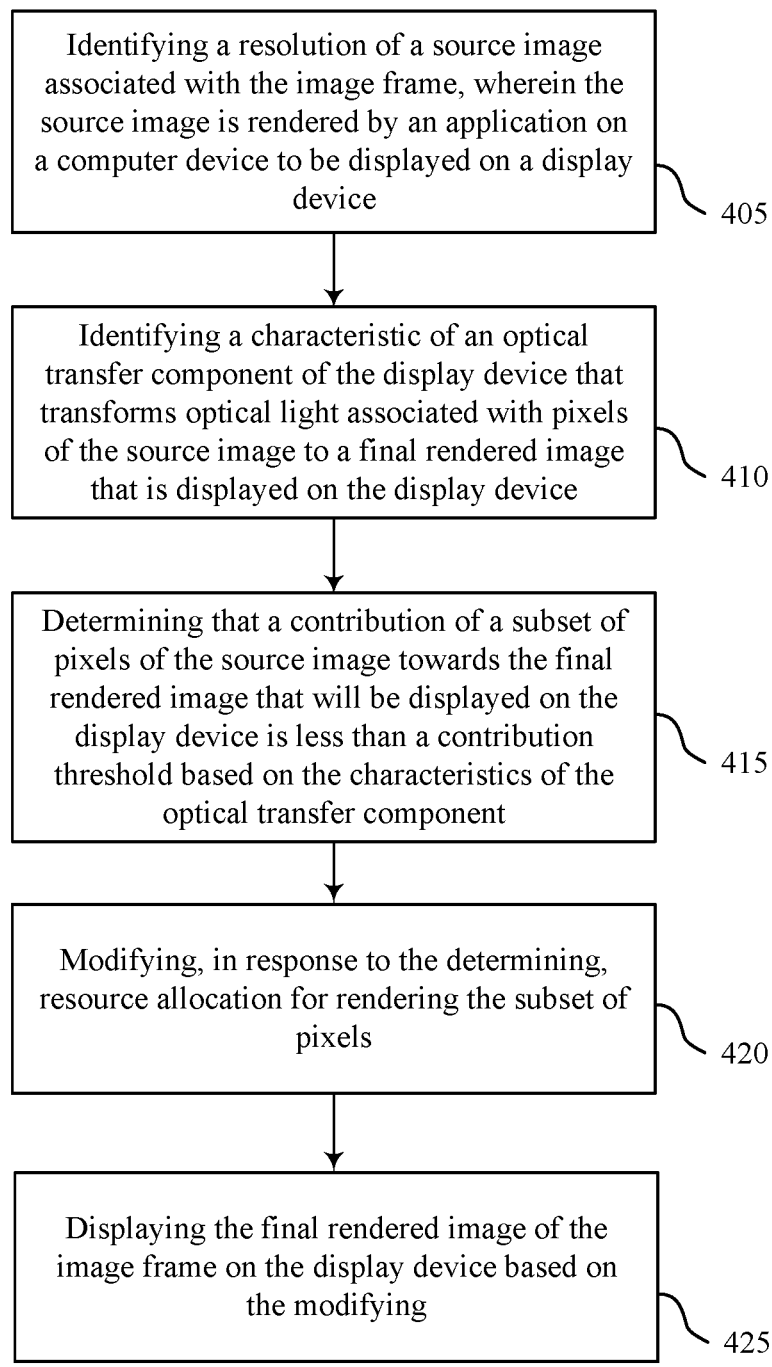
FIG. 4 is a flowchart of an example method for processing an image frame in accordance with an implementation of the present disclosure.

Referring now to FIG. 4, illustrated is a method 400 that may be used by computer device 102 (FIG. 1) and/or the display device 105 (FIG. 1) to process image frames using compositor 28 (FIG. 1). Compositor 28 may include a lens distortion corrector 38 to apply lens distortion corrections, such as to account for barrel distortion and chromatic aberration in the projection of the original image into the composite image 46 in the final virtual environment 54.

Figure 5:
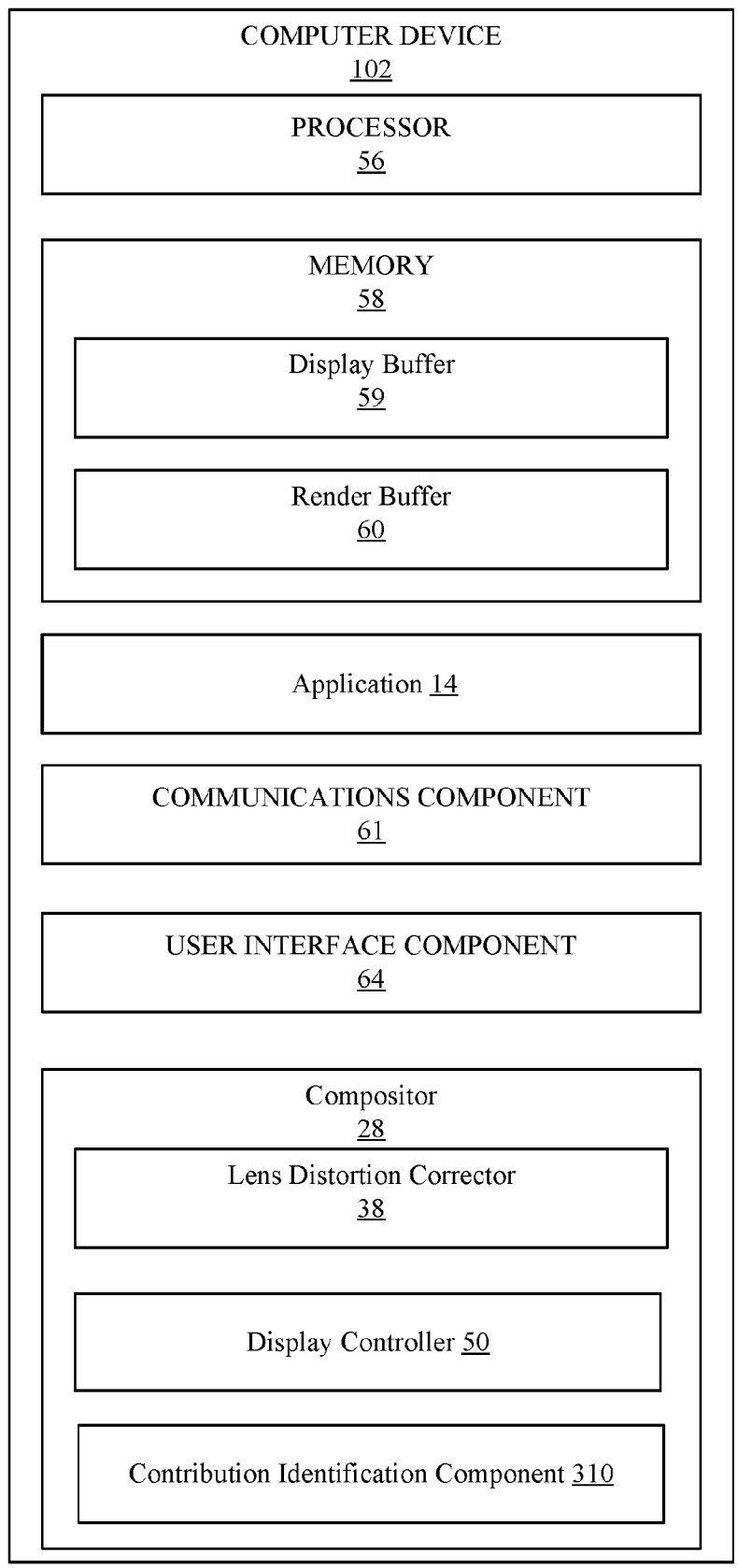
FIG. 5 is a schematic block diagram of an example device in accordance with an implementation of the present disclosure.

At 405, method 400 may include identifying a resolution of a source image associated with the image frame. The source image may be rendered by an application on a computer device to be displayed on a display device. In some examples, identifying the resolution may include identifying a set of pixels of the image frame to be rendered on a display device. In some implementations, the display controller 50 (FIG. 1) may identify the set of pixels of the image frame that may be stored in the display buffer 59 (FIG. 5). The image frame may be associated with a virtual environment 54 that is projected on the display device 105 (e.g., HMD).

At block 410, the method 400 may include identifying a characteristic of an optical transfer component of the display device that transforms optical light associated with pixels of the source image to a final rendered image that is displayed on the display device. As discussed above, this identifying may include compositor 28 (FIG. 1A) and contribution identification component 310 (FIG. 3) operating selectively populating the render buffer 60, based on the lens characteristics of the optical transfer component, by tracing which of the pixels of the render buffer 60 end up in the final display buffer 59, and applying a binary or non-binary function for including or weighting such pixels in the render buffer 60.

At block 415, the method may include determining that a contribution of a subset of pixels of the source image towards the final rendered image that will be displayed on the display device is less than a contribution threshold based on the characteristics of the optical transfer component. In some implementations, compositor 28, and more specifically the lens distortion corrector 38, may compute which pixels stored in the render buffer 60 (FIG. 5) may be sourced for the final rendered image to be displayed. Specifically, as noted above, as the pixel position moves away from the center of an image (e.g., final rendered image), greater number of pixels may contribute less than the contribution threshold and thus their processing may be omitted (binary weighting solution) or may be reduced (non-binary weighting solution). In some examples, it may be that one or more pixels stored in the render buffer 60 may not contribute at all to the final rendered image that is projected based on pixels stored in the rendered buffer 60 after optics transformation (e.g., lens distortion) is applied to the light associated with the one or more pixels. Thus, by identifying pixels from the complete set of pixels stored in the render buffer 60 that may not contribute, or that may contribute less than a contribution threshold, the lens distortion corrector 38 may save resources that would otherwise be expended in rendering content to be displayed at a slightly larger resolution than the actual resolution of the panel. Specifically, in some examples, determining that contribution of the subset of pixels towards the final rendered image that will be displayed on the display device is less than the contribution threshold is based on one or more of: a lens characteristic of the display device, a physical display size of the final rendered image, or a resolution of a source image associated with the image frame.

At block 420, the method may include modifying, in response to the determining, resource allocation for rendering the subset of pixels. In some implementations, the lens distortion corrector 38 in collaboration with the display controller 50 may modify the resource allocation for rendering the subset of pixels by either omitting and/or deprioritizing the subset of pixels in rendering of the final rendered image. Thus, in some examples, modifying the resource allocation may include either fully including and/or omitting subset of pixels from rendering based on the binary solution (e.g., either omitting the entire pixel), or fully or partially modifying the pixel based on the weighting value associated with the non-binary solution (e.g., reducing the processor and memory allocation to render a set of pixels such that lower resolution of pixels may be utilized based on the weighted values). As such, deprioritizing the subset of pixels may include allocating a weighted value to each of the subset of pixels. The weighted value may be assigned based on a distance, in the continuous space, of the subset of pixels from the sourcing position. Thus, the pixels that are further away from a sourcing position may be weighted less than the pixels that are closer to the sourcing position. To that end, the lens distortion corrector 38 and the display controller 50 may determine that the distance of the subset of pixels from the sourcing position is greater than a position threshold (e.g., fixed or dynamically adjusted sourcing position within the final rendering image), and omit the subset of pixels based on determining that the distance of the subset of pixels from the sourcing position is greater than a position threshold.

As such, modifying the resource allocation for rendering the subset of pixels may be based on the binary or non-binary weighted value of each of the subset of pixels. In some examples, the sourcing position may be determined by identifying which pixels in the render buffer 60 that will source the final rendering image, in a continuous space, based on the pixels that are sourced to the display buffer 59.

At block 423, the method may include displaying the final rendered image of the image frame on the display device based on the modifying. In some implementations, the display controller 50 in conjunction with the display interface 51 may project the images associated with the final rendered image of the image frame to the display panel 52 of the display device 105 based on the subset of pixels in the display buffer 59, and alternatively or additionally based on their respective weighted values. The display device 105 may be one or more of one or more of a HMD device, smart phone, or a tablet.

Referring now to FIG. 5, illustrated is an example computer device 102 in accordance with an implementation, including additional component details as compared to FIG. 1. As noted above, in some examples, components illustrated as part of the computer device 102 may also be implemented directly within the display device 105. In such situations, the term "computer device" may also refer to stand alone display device(s) 105 such as HMD devices, smart phones, or tablet. In one example, computer device 102 may include processor 56 for carrying out processing functions associated with one or more of components and functions described herein. Processor 56 can include a single or multiple set of processors or multi-core processors. Moreover, processor 56 can be implemented as an integrated processing system and/or a distributed processing system.

Computer device 102 may further include memory 58, such as for storing local versions of applications being executed by processor 56. Memory 58 can include a type of memory usable by a computer, such as random access memory (RAM), read only memory (ROM), tapes, magnetic discs, optical discs, volatile memory, non-volatile memory, and any combination thereof. Additionally, processor 56 and memory 58 may include and execute operating system 110 (FIG. 1). The memory may include display buffer 59 that stores one or more pixels associated with an image frame (e.g., source image) to be displayed on the display device 105. The memory may also include a display buffer 59 that may store a subset of pixels from the set of pixels included in the render buffer 60. The subset of pixels stored in the display buffer 59 may reflect the one or more pixels that may contribute towards the final rendered image for the image frame that is eventually displayed on the display device 105, such as based on a binary or non-binary weighting solution as described above.

Further, computer device 102 may include a communications component 61 that provides for establishing and maintaining communications with one or more parties utilizing hardware, software, and services as described herein. Communications component 61 may carry communications between components on computer device 102, as well as between computer device 102 and external devices, such as devices located across a communications network and/or devices serially or locally connected to computer device 102. For example, communications component 61 may include one or more buses, and may further include transmit chain components and receive chain components associated with a transmitter and receiver, respectively, operable for interfacing with external devices.

Computer device 102 may also include a user interface component 64 operable to receive inputs from a user of computer device 102 and further operable to generate outputs for presentation to the user. User interface component 64 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 64 may include one or more output devices, including but not limited to a display, a speaker, a haptic feedback mechanism, a printer, any other mechanism capable of presenting an output to a user, or any combination thereof.

In an implementation, user interface component 64 may transmit and/or receive messages corresponding to the operation of applications 14, compositor 28, display controller 50, and/or display interface 51.

The computer device 102 may also include a compositor 28 that utilizes the lens distortion corrector 38 and the display controller 50 to process one or more image frames to be displayed on the display device 105. The lens distortion corrector 38 may identify one or more subset of pixels in the render buffer 59 that fail to contribute, or contribute less than a contribution threshold. The display controller 50 may utilize the information provided by the lens distortion corrector 38 to modify resources (e.g., processor 56 and memory 58) such that resources allocated to pixels that contribute less than the contribution threshold are reduced (e.g., utilizing less resolution for the selected subset of pixels, including processing less based on a weight value or completely omitting from further processing).

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/ or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method for processing an image frame, comprising:
    identifying a resolution of a source image associated with the image frame, wherein the source image is rendered by an application on a computer device to be displayed on a display device;
    identifying a characteristic of an optical transfer component of the display device that transforms optical light associated with pixels of the source image to a final rendered image that is displayed on the display device by tracing which of the pixels of the source image end up in the final rendered image due to the identified characteristic of the optical transfer component;
    determining that a contribution of a subset of pixels of the source image towards the final rendered image that will be displayed on the display device is less than a contribution threshold based on the identified characteristic of the optical transfer component;
    modifying, in response to the determining, resource allocation for rendering the subset of pixels including one or both of omitting or deprioritizing the subset of pixels in rendering of the final rendered image; and
    displaying the final rendered image of the image frame on the display device based on the modifying.

2. The method of claim 1, wherein modifying the resource allocation for rendering the subset of pixels further comprises:
    allocating a weighted value to each of the subset of pixels determined to contribute less than the contribution threshold; and
    modifying the resource allocation for rendering the subset of pixels based on each weighted value.

3. The method of claim 2, wherein allocating the weighted value to each of the subset of pixels comprises:
    determining a sourcing position of the subset of pixels within the final rendered image, wherein the sourcing position is determined by identifying where a display buffer will source its pixels associated with the final rendered image, in a continuous space, from within a render buffer; and
    applying the weighted value to each of the subset of pixels based on the sourcing position.

4. The method of claim 3, wherein allocating the weighted value to each of the subset of pixels comprises assigning the weighted value based on a distance, in the continuous space, of the subset of pixels from the sourcing position of a closest contributing pixel.

5. The method of claim 4, further comprising:
    determining that the distance of the subset of pixels from the sourcing position is greater than a position threshold; and
    omitting the subset of pixels based on determining that the distance of the subset of pixels from the sourcing position is greater than a position threshold.

6. The method of claim 1, wherein the display device is one or more of a head-mounted display (HMD) device, smart phone, or a tablet.

7. The method of claim 1, wherein the contribution threshold is a single contribution threshold.

8. A computer device for processing image data, comprising:
- a memory to store data and instructions; and
- a processor in communication with the memory to execute the instructions to:
  - identify a resolution of a source image associated with an image frame, wherein the source image is rendered by an application on a computer device to be displayed on a display device;
  - identify a characteristic of an optical transfer component of the display device that transforms optical light associated with pixels of the source image to a final rendered image that is displayed on the display device by tracing which of the pixels of the source image end up in the final rendered image due to the identified characteristic of the optical transfer component;
  - determine that a contribution of a subset of pixels of the source image towards the final rendered image that will be displayed on the display device is less than a contribution threshold based on the identified characteristic of the optical transfer component;
  - modify, in response to the determining, resource allocation for rendering the subset of pixels including one or both of omitting or deprioritizing the subset of pixels in rendering of the final rendered image; and
  - display the final rendered image of the image frame on the display device based on the modifying.

9. The computer device of claim 8, wherein the instructions to modify the resource allocation for rendering the subset of pixels are further executable by the processor to:
- allocate a weighted value to each of the subset of pixels determined to contribute less than the contribution threshold; and
- modify the resource allocation for rendering the subset of pixels based on the weighted value.

10. The computer device of claim 9, wherein the instructions to allocate the weighted value to each of the subset of pixels are further executable by the processor to:
- determine a sourcing position of the subset of pixels within the final rendered image, wherein the sourcing position is determined by identifying where a display buffer will source its pixels associated with the final rendered image, in a continuous space, from within a rendered buffer; and
- apply the weighted value to each of the subset of pixels based on the sourcing position.

11. The computer device of claim 10, wherein the weighted value is assigned based on a distance, in the continuous space, of each of the subset of pixels from the sourcing position of a closest contributing pixel.

12. The computer device of claim 11, wherein the instructions are further executable to:
- determine that the distance of the subset of pixels from the sourcing position is greater than a position threshold; and
- omit the subset of pixels based on determining that the distance of the subset of pixels from the sourcing position is greater than a position threshold.

13. The computer device of claim 8, wherein the display device is one or more of a head-mounted display (HMD) device, smart phone, or a tablet.

14. The computer device of claim 8, wherein the contribution threshold is a single contribution threshold.

15. A non-transitory computer-readable medium storing instructions executable by a computer device, the instructions comprising code for:
- identifying a resolution of a source image associated with an image frame, wherein the source image is rendered by an application on a computer device to be displayed on a display device;
- identifying a characteristic of an optical transfer component of the display device that transforms optical light associated with pixels of the source image to a final rendered image that is displayed on the display device by tracing which of the pixels of the source image end up in the final rendered image due to the identified characteristic of the optical transfer component;
- determining that a contribution of a subset of pixels of the source image towards the final rendered image that will be displayed on the display device is less than a contribution threshold based on the identified characteristic of the optical transfer component;
- modifying, in response to the determining, resource allocation for rendering the subset of pixels including one or both of omitting or deprioritizing the subset of pixels in rendering of the final rendered image; and
- displaying the final rendered image of the image frame on the display device based on the modifying.

16. The non-transitory computer-readable medium of claim 14, the code for modifying the resource allocation for rendering the subset of pixels further comprises code for:
- allocating a weighted value to each of the subset of pixels determined to contribute less than the contribution threshold; and
- modifying the resource allocation for rendering the subset of pixels based on the weighted value.

17. The non-transitory computer-readable medium of claim 16, wherein the code for allocating the weighted value to each of the subset of pixels further comprises code for:
- determining a sourcing position of the subset of pixels within the final rendered image, wherein the sourcing position is determined by identifying where a display buffer will source its pixels associated with the final rendered image, in a continuous space, from within a rendered buffer; and
- applying the weighted value to each of the subset of pixels based on the sourcing position.

18. The non-transitory computer-readable medium of claim 17, wherein the weighted value is assigned based on a distance, in the continuous space, of each of the subset of pixels from the sourcing position of a closest contributing pixel.

19. The non-transitory computer-readable medium of claim 16, wherein the code further comprises:
- determining that the distance of the subset of pixels from the sourcing position is greater than a position threshold; and
- omitting the subset of pixels based on determining that the distance of the subset of pixels from the sourcing position is greater than a position threshold.

20. The non-transitory computer-readable medium of claim 14, wherein the contribution threshold is a single contribution threshold.

* * * * *